(12) United States Patent
Kajekar et al.

(10) Patent No.: US 8,078,679 B2
(45) Date of Patent: Dec. 13, 2011

(54) METHOD AND SYSTEM FOR AUTOMATING COLLATERAL CONFIGURATION IN A NETWORK

(75) Inventors: Preetham Kajekar, Bangalore (IN); Krishna Sathyanarayana, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 538 days.

(21) Appl. No.: 11/403,794

(22) Filed: Apr. 12, 2006

(65) Prior Publication Data

US 2007/0244995 A1    Oct. 18, 2007

(51) Int. Cl.
*G06F 15/16* (2006.01)
(52) U.S. Cl. ........................................ 709/205
(58) Field of Classification Search .................. None
See application file for complete search history.

(56) References Cited

U.S. PATENT DOCUMENTS

| | | | | |
|---|---|---|---|---|
| 6,496,858 | B1* | 12/2002 | Frailong et al. | 709/221 |
| 7,039,724 | B1* | 5/2006 | Lavian et al. | 709/250 |
| 7,526,541 | B2* | 4/2009 | Roese et al. | 709/223 |
| 2003/0005030 | A1* | 1/2003 | Sutton et al. | 709/200 |
| 2003/0110242 | A1* | 6/2003 | Brown et al. | 709/222 |
| 2004/0064538 | A1* | 4/2004 | Wong | 709/223 |
| 2006/0074952 | A1* | 4/2006 | Rothman et al. | 707/101 |
| 2007/0027965 | A1* | 2/2007 | Brenes et al. | 709/220 |

OTHER PUBLICATIONS

P.Martinez, et al. Using the Script MIB for Policy-Based Configuration Management, Network Operations and Management Symposium 2002, Apr. 15-19, 2002, 187-202, NEC Eur. LTD, Heidelberg, Germany.

* cited by examiner

*Primary Examiner* — Ario Etienne
*Assistant Examiner* — Clayton R Williams
(74) *Attorney, Agent, or Firm* — Fish & Richardson P.C.

(57) ABSTRACT

In one embodiment of the invention, a method for automating collateral configuration in a network is provided. A service is configured on a network device (termed as service providing device). The service providing device sends a Collateral Configuration Request Protocol (CCRP) message to other network devices (termed as service accessing devices). The service accessing devices process the CCRP message for their automatic collateral configuration in order to access the configured service on the service providing device.

24 Claims, 5 Drawing Sheets

METHOD AND SYSTEM FOR AUTOMATING COLLATERAL CONFIGURATION IN A NETWORK

BACKGROUND OF THE INVENTION

1. Field of Invention

Embodiments of the invention relate, in general, to network management. More specifically, embodiments of the invention relate to methods and systems for collateral configuration in a network.

2. Description of the Background Art

Collateral configuration refers to changes made in the configuration of network devices to access a particular service in a network. Services in the network can include services for file transfer, application transfer, remote access to the Internet or to a virtual private network (VPN), domain name services, database access, electronic mail, and so forth. The configuration change can include opening IP ports, creating packet filtering rules, altering packet header information, traffic identification, rate limiting of sessions, among others. The configuration of a network device can be altered by one of two methods: static or dynamic. Static configuration involves removing network devices temporarily from the network in order to configure them. Dynamic configuration involves configuration of a network device while it is still functioning in the network.

Typically, collateral configuration of the network device involves a network administrator. The network administrator configures the network device by reading release notes, configuration manuals, or installation guides for the network device. Unfortunately, this material can often be out dated and no longer accurate. For example, enabling a web server on a non standard port (like 'Cisco works' running on port 1741) requires the configuration of the router/firewall in the path of the web server by the network administrator to permit traffic to the port 1741.

With the emergence of new network technologies and services, collateral configuration has become more complex. Conventional methods of collateral configuration are difficult to apply in large network setups. The network administrator may need to open up certain ports on a large number of network devices to enable a particular service to become operational in the network. Further, collateral configuration by conventional methods becomes more complex in case of removal of a service from a large network, and configuration of the same service in another network. For example, manual decommissioning of a VPN service from a network and configuration of VPN service in another network requires the network administrator to manually remove configuration from all network devices related to the VPN service. The complexity of the manual collateral configuration increases with an increase in network size if different devices are used for the service. Therefore, the conventional methods do not provide flexibility or ease in achieving collateral configuration in a network.

DETAILED DESCRIPTION OF EMBODIMENTS OF THE INVENTION

Various embodiments of the invention provide methods, systems, and computer-readable media for automating collateral configuration in a network. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In accordance with the present invention, a network device is configured to provide a service in a network. The network device creates and sends a Collateral Configuration Request Protocol (CCRP) message to other network devices or to Network Management System (NMS). The CCRP message is based on the service configured in the network device. Thereafter, the other network devices receive the CCRP message and process the received CCRP message to alter their configuration for accessing the configured service on the network device.

Figure 1:
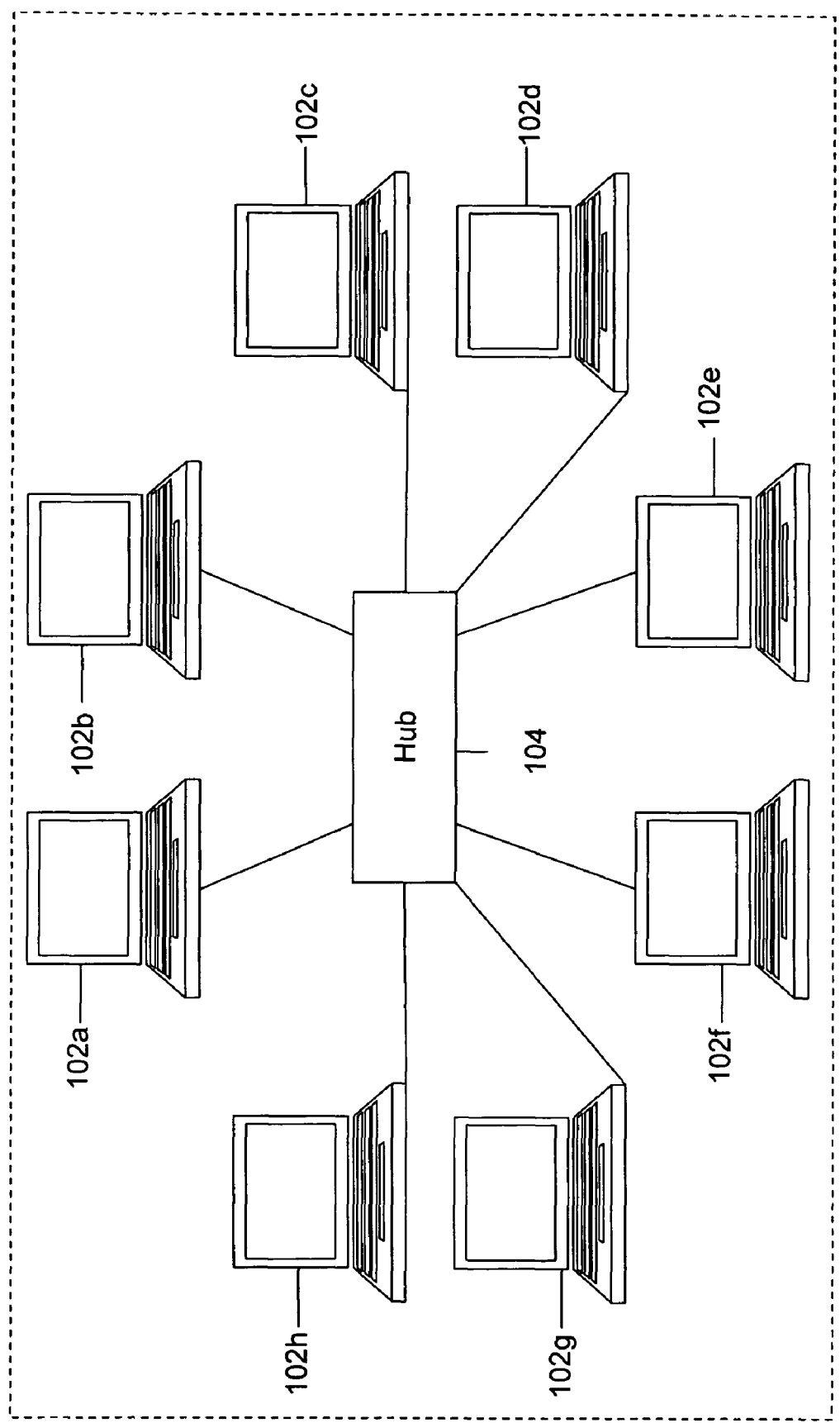
FIG. 1 illustrates an environment wherein various embodiments of the invention can be performed.

Referring now to the drawings, more particularly by their reference numbers, FIG. 1 illustrates a network 100 wherein various embodiments of the invention can be performed. Network 100 includes network devices 102*a*-102*h* that are connected to each other via hub 104. Examples of network 100 include the Internet, a Local Area Network (LAN), a Wide Area Network (WAN), an Ethernet or a combination of two or more of these networks. Examples of network devices 102*a*-102*h* include data processing units, hosts, routers, switches, servers, mobile, telecommunication devices or computer. To illustrate, in one embodiment of the invention, a service is configured on network device 102*a* (hereinafter referred to as service providing device 102*a*). The service configured on service providing device 102*a* can be accessed by network devices 102*b*-102*h* (hereinafter referred to as service accessing devices 102*b*-102*h*). Service accessing devices 102*b*-102*h* receive a CCRP message from service providing device 102*a* in order to facilitate access to the configured service. Thereafter, service accessing devices 102*b*-102*h* process the CCRP message and alter their configuration on the basis of the CCRP message. Typically, intermediate devices receive and process the CCRP messages. These intermediate devices are present on the path to the service providing device. The intermediate devices may be firewalls or routers. This has been explained in conjunction with FIGS. 2 and 3. In various embodiments of the invention, the configured service includes services for file transfer, application transfer, and the like. Examples of altering the configuration on service accessing devices 102*b*-102*h* include opening IP ports, creating packet filtering rules, altering packet header information, and the like.

In an embodiment of the invention, network 100 has been illustrated with eight network devices 102*a*-102*h*, but a person skilled in the art will understand that network 100 typically includes a plurality of such devices and may have either less than or more than the eight illustrated network devices 102a-102h.

Figure 2:
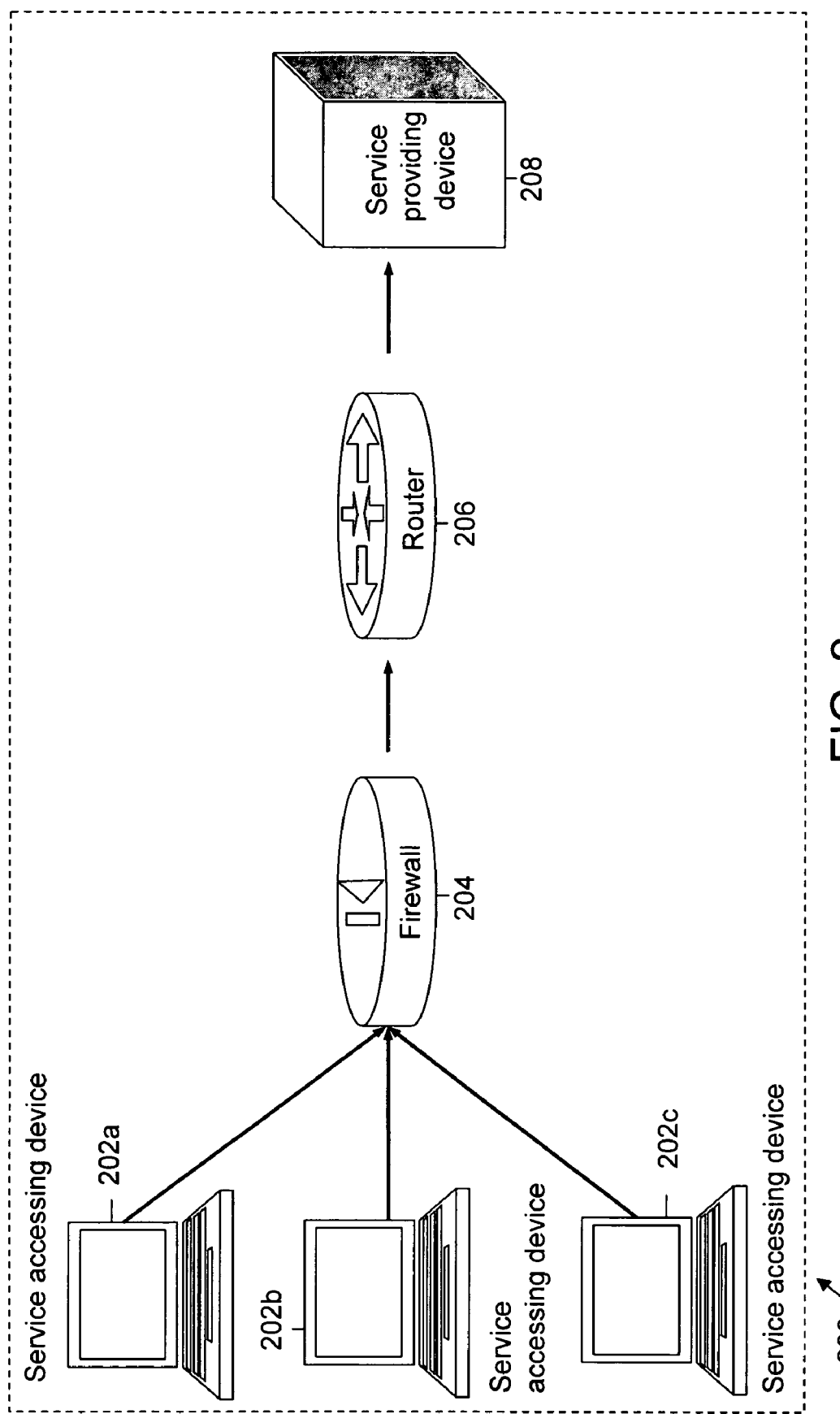
FIG. 2 illustrates a system for automating collateral configuration in a network, in accordance with an exemplary embodiment of the invention.

FIG. 2 illustrates system 200 for automating collateral configuration in a network, in accordance with an exemplary embodiment of the invention. System 200 includes network devices 202a, 202b, 202c (collectively referred to as service accessing devices 202), and another network device, referred to as a service providing device 208 that are connected to each other by network infrastructure devices, hereinafter individually referred to as firewall 204 and router 206 for the purpose of illustrating an embodiment of the invention. Other examples of network infrastructure devices include gateways, switches, hubs, wireless access devices, and the like.

In an embodiment of the invention, service accessing devices 202 are connected to firewall 204. Firewall 204 is connected in turn to router 206. Router 206 is also connected to service providing device 208. Service providing device 208 provides a particular service to service accessing devices 202. Firewall 204 may be a packet filtering firewall, circuit level relay firewall, proxy firewall, or the like. Service providing device 208 may be a web server, email server, FTP (File Transfer Protocol) server, network management system, virtual private network (VPN) concentrator, or the like.

In system 200, a service is configured on service providing device 208 and automatic collateral configuration is achieved to allow service accessing devices 202 to access the configured service.

To illustrate an embodiment of the invention, a service of providing web pages to service accessing devices 202 is configured on service providing device 208. Therefore, service providing device 208 functions as a web server where the web pages are provided by service providing device 208 on certain port, (for example, like 'Cisco works' which runs on a non-standard port 1741).

In order to configure the network infrastructure devices, service providing device 208 creates a CCRP message based on the service of providing web pages and forwards the CCRP message to each network infrastructure device such as router 206. The acronym "CCRP" refers to a collateral configuration request protocol. The CCRP message is sent out by a service providing device to other network infrastructure devices to request collateral configuration changes based on a service that has been configured on the service providing device.

Thereafter, router 206 receives the CCRP message and allows hyper text transfer protocol (http) traffic on service providing device 208 from service accessing devices 202 to port 1741. The content of the CCRP message provides sufficient information that informs the receiving device of the need to modify its configuration. With the CCR protocol, devices can act appropriately based upon the information provided in the CCRP message. To illustrate, a service providing device may send a request to a network infrastructure device to allow traffic flow X to enter its interface/IP Y.

The CCRP message requests collateral configuration of a network infrastructure device or other network device based on the particular service configured on the service providing device. The CCR protocol is ideally suited for static collateral configuration embodiments because the CCR protocol is a more generic mechanism of collateral configuration than ZedIP, for example. Consider a case where a VPN service is hosted on a DMZ. For the VPN to function properly, several ports like NAT-T (udp 4500), protocol esp, IKE (udp 500) are opened in the firewall. In addition to this there could be some static configuration like rate limiting of IKE sessions on the firewall to prevent DOS attacks. If the VPN service is moved to a different network or the service is decommissioned, the user has to manually remove the previous configurations but the CCR protocol addresses this problem as well. Essentially, the CCR protocol is a mechanism that provides the flexibility or ease of working on a single integrated service device even when different devices are used by various services.

The CCRP messages preferably includes a "TO" field that indicates what kind of device and the role of the device these messages are intended for. For example, a VPN can send out messages to open up certain port to all INBOUND_FIREWALL (some predefined role) devices. Devices which are playing this role would process the CCRP messages. It is important to note that CCRP messages are not directed to specific devices.

Referring again to FIG. 2, router 206 configures itself upon receipt of the CCRP message according to the content of the CCRP message. Thus, router 206 allows traffic flow between service accessing devices 202 and service providing device 208. This allows service accessing devices 202 access to the service of providing web pages at port 1741 without requiring a network administrator to spend time and effort to manually configure each network infrastructure device in the network. Not only can the time savings alone can be substantial but downtime associated with an erroneously configured network infrastructure device can be eliminated.

As networks become complex, collateral configuration need to be intelligent to minimize the chore of configuring network infrastructure devices. To illustrate, the service providing device sends the CCRP message to a Network Management System (NMS). The NMS, based on its knowledge of the network topology, can intelligently forward the CCRP message to network infrastructure devices that need to be configured. This will further be explained in conjunction with FIG. 3. The NMS can also act as a bridge between devices that understand the CCRP messages and those which do not. Embodiments of the invention do not have to be fully automatic because the CCRP messages may be sent to an intermediate network management station where a network administrator may "approve" each message before it is forwarded to other network infrastructure devices. Embodiments of the present invention also provide for the CCRP messages to include a priority categorization for each CCRP message to allow fine grain control.

In another embodiment of the invention, in system 200 service providing device 208 forwards a CCRP message directly to firewall 204. The configuration of firewall 204 is altered to allow http traffic to flow to port 1741 on service providing device 208. The firewall configuration can be altered by mechanisms like 'Zed IP', which is a firewall control protocol and configures the firewalls by creating pinholes in them. It will be appreciated that references to port 1741 are for illustration purpose only and is not a limitation on the scope of the collateral configuration.

Figure 3:
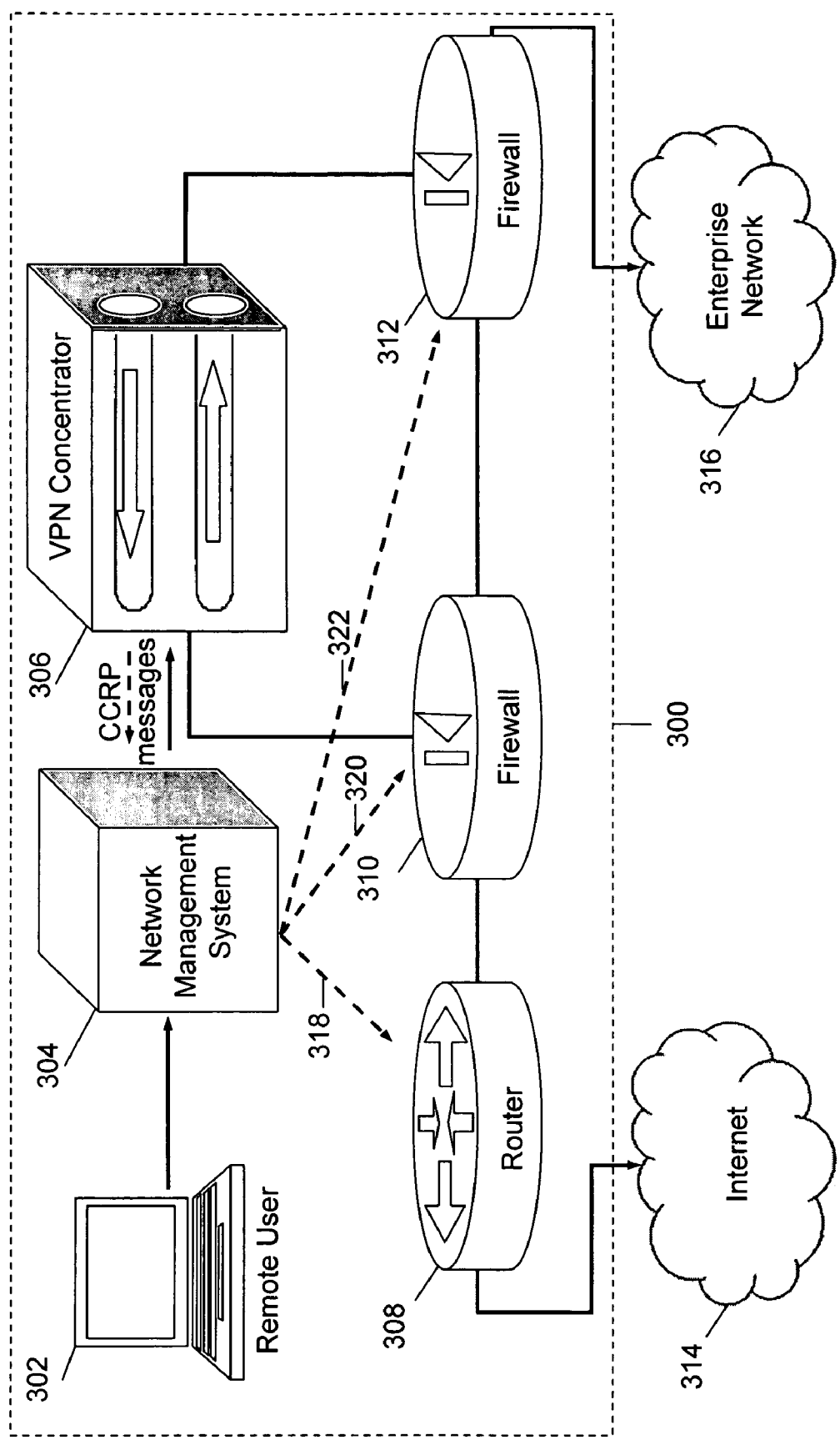
FIG. 3 illustrates a system for automating collateral configuration in a network, in accordance with another exemplary embodiment of the invention.

FIG. 3 illustrates system 300 for automating collateral configuration in a network, in accordance with another exemplary embodiment of the invention. System 300 includes network devices such as remote user 302, network management system (NMS) 304, virtual private network (VPN) concentrator 306, router 308, firewalls 310 and 312. Remote user 302 configures remote access to enterprise network 316 with network address translation traversal (NAT-T). NMS 304 includes an application that manages remote user 302, virtual private network (VPN) concentrator 306, router 308, and firewalls 310 and 312. VPN concentrator 306 is a device that allows remote access to VPN. When a network administrator configures remote access to enterprise network 316 via VPN concentrator 306, VPN concentrator 306 sends different commands to NMS 304. NMS 304 receives and analyzes these commands and configures router 308, and firewalls 310 and 312 on the basis of these commands.

When a new service is configured in the network, NMS 304 handles the collateral configuration by configuring router 308, and firewalls 310 and 312 based on CCRP messages 318, 320, and 322, respectively. On the basis of CCRP message 318, NMS 304 configures router 308 to allow Internet Key Exchange (IKE)/Internet Protocol Security (IpSec) traffic to and from Internet 314. On the basis of CCRP message 320, NMS 304 configures firewall 310 to permit Network Address Translation Traversal (NAT-T port user datagram protocol port 4500) to allow traffic to and from Internet 314. On the basis of CCRP message 322, NMS 304 configures firewall 312 to permit traffic flow between remote user 302 and enterprise network 316.

In one embodiment of the invention, the collateral configuration of router 308, and firewalls 310 and 312 is performed by executable software (computer code) stored in computer readable medium in NMS 304, which generates a series of CCRP messages. In another embodiment of the invention, the software is present in VPN concentrator 306 for performing automatic collateral configuration of the network.

Upon receipt of the CCRP message VPN concentrator 306 analyzes the CCRP message and alters the configuration of router 308 and firewalls 310 and 312. Therefore, the invention is not limited to automating collateral configuration by NMS 304.

In an embodiment of the invention, FIG. 3 illustrates a system for automating collateral configuration in a network. However, the present invention is also capable of manually achieving collateral configuration in the network. For example, NMS 304 receives the CCRP messages but does not process them. Rather, the network administrator manually processes each CCRP message to allow the collateral configuration of network infrastructure devices such as router 308 and firewalls 310 and 312. FIG. 3 has been explained with the help of firewall services. However, the present invention can also be applied to other services in addition to firewall services. For example, if the service configured on remote user 302 includes audio streaming, remote user 302 sends a CCRP message to NMS 304. NMS 304 receives the CCRP message and processes it. Based on the CCRP message, NMS 304 alters the Quality of Service (QoS) configuration of router 308, and firewalls 310 and 312, to provide the required bandwidth to remote user 302 for audio streaming.

Figure 4:
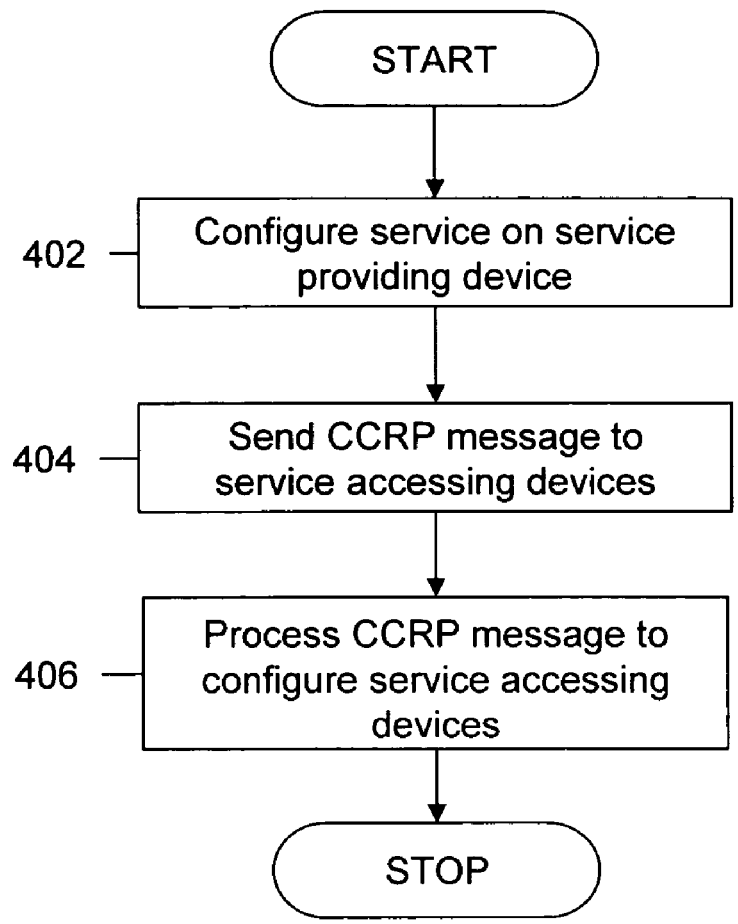
FIG. 4 is a flowchart illustrating a method for automating collateral configuration in a network, in accordance with an exemplary embodiment of the invention.

FIG. 4 is a flowchart illustrating a method for automating collateral configuration in a network, in accordance with an exemplary embodiment of the invention. The flowchart has been described with reference to FIG. 1. At 402, a service is configured on service processing device 102a. Thereafter, at 404, service processing device 102a sends a CCRP message to service accessing devices 102b-102h. The CCRP message can be sent as message packets or as a protocol exclusively dedicated for configuration purposes. In another embodiment of the invention, a network management system is present between service processing device 102a and service accessing devices 102b-102h. Service processing device 102a sends the CCRP message to network management system. At 406, service accessing devices 102b-102h process the CCRP message to be collaterally configured based on the CCRP message. In another embodiment of the invention, the CCRP message is processed by NMS to collaterally configure service accessing devices 102b-102h in network 100. The collateral configuration of service accessing devices 102b-102h allows them access to the service configured on service providing device 102a.

In yet another embodiment of the invention, the network infrastructure devices such as firewalls and routers receive and process the CCRP message. This has been illustrated in FIGS. 2 and 3.

Figure 5:
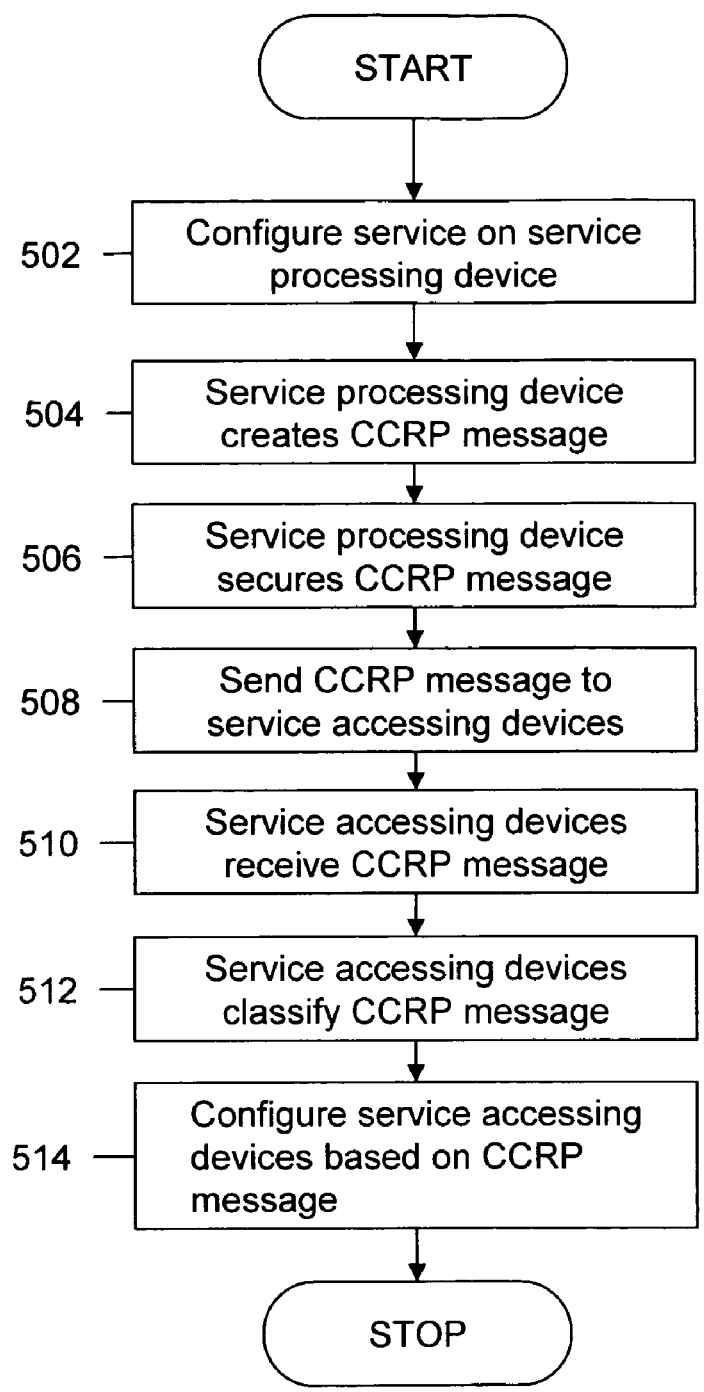
FIG. 5 is a flowchart illustrating a method for automating collateral configuration in a network, in accordance with another exemplary embodiment of the invention.

FIG. 5 is a flowchart illustrating a method for automating collateral configuration in a network, in accordance with another exemplary embodiment of the invention. The flowchart is been described with reference to FIG. 1. At 502, a service is configured on service providing device 102a. In various embodiments of the invention, the configured service on service providing device 102a includes availability of web pages, files, or applications. In one embodiment of the invention, the configured service on service providing device 102a includes enabling remote access to a Virtual Private Network (VPN). In another embodiment of the invention, the configured service on service providing device 102a includes allowing a type of message traffic to a particular port or address. At 504, service providing device 102a creates a CCRP message on the basis of the type of configured service. For example, if the configured service on service providing device 102a includes the availability of web pages, files, or applications, then, the CCRP message is created to allow service accessing devices 102b-102h to facilitate access to the available web pages, files or applications. The created CCRP message contains the reasons for sending the CCRP message, based on the configured service. These reasons help service accessing devices 102b-102h in auto configuring and auditing. The created CCRP message also contains abstract directives for collateral configuration of service accessing devices 102b-102h. In order to allow interoperability, the created CCRP message does not contain Command Line Interface (CLI). The CCRP message also includes a destination field indicating the kind of service accessing devices 102b-102h to which the CCRP message would be sent.

At 506, service providing device 102a secures the CCRP message. In various embodiments of the invention, securing the CCRP message includes the use of mechanisms like public key encryption, pre-shared keys, Internet key exchange, and the like. At 508, service providing device 102a sends the CCRP message to service accessing devices 102b-102h. In an embodiment of the invention, the CCRP message is sent through a secure communication protocol. For example, hyper text transfer protocol secured (https) is the secure communication protocol.

At 510, the secured CCRP message is received by service accessing devices 102b-102h. At 512, the CCRP message is classified by service accessing devices 102b-102h. In an embodiment of the invention, the network infrastructure devices such as firewalls and routers receive and classify the secured CCRP message. This has been illustrated in FIGS. 2 and 3. The classification of CCRP message facilitates the reaction of service accessing devices 102b-102h to the CCRP message. For example, the CCRP message can be classified for packet filtration or for maintaining the Quality of Service (QoS). In an embodiment of the invention, classification is accomplished by 'C3PL mechanism'. Classification involves the process of authenticating the CCRP message and abstracting it. In an embodiment of the invention, the authentication mechanism is Internet Key Encryption (IKE) mechanism. Abstraction of CCRP message includes understanding the CCRP message.

On completing the CCRP message classification, service accessing devices 102b-102h get configured on the basis of the received CCRP message. In an embodiment of the invention, the CCRP message is created to allow service accessing devices 102b-102h to facilitate access to the available web pages, files or applications from service providing device 102*a*. The ports of service accessing devices 102*b*-102*h* are opened in a manner that allows traffic flow between service accessing devices 102*b*-102*h* and service providing device 102*a*. At 514, all the service accessing devices 102*b*-102*h* are configured on the basis of the received CCRP message.

In another embodiment of the invention, service providing device 102*a* can send a message containing instructions to rollback the collateral configuration of service accessing devices 102*b*-102*h*. The rollback instructions also carry an 'unconfiguration flag'. For example, if the message contains information about decommissioning the configuration of service, such as VPN from service accessing devices 102*b*-102*h*, service accessing devices 102*b*-102*h* process the message and decommission the configuration of VPN.

The collateral configuration of service accessing devices 102*b*-102*h* is achieved using static as well as dynamic configuration. Static configuration involves removing service accessing devices 102*b*-102*h* temporarily out of a network in order to configure them. In one embodiment of the invention, NMS 304 sends a CCRP message to router 308. Router 308 receives the CCRP message but the CCRP message does not automatically get processed by router 308. A network administrator temporarily draws out router 308 from the network and processes the CCRP message to configure it.

Dynamic configuration involves configuring service accessing devices 102*b*-102*h* while service accessing devices 102*b*-102*h* are functional in the network. In an embodiment of the invention, NMS 304 sends a CCRP message to router 308. Router 308 receives the CCRP message and processes the CCRP message while staying functional in the network. Router 308 dynamically alters its configuration while remaining operational within the network. In one embodiment of the invention, when VPN tunnel is present in an EzVPN network extension mode, VPN concentrator dynamically requests a firewall present in the EzVPN network to permit traffic through the VPN tunnel.

In another embodiment of the invention, automatic collateral configuration can work with protocols like File Transfer Protocol (FTP, which is used with two TCP channels over TCP port 21 and TCP port 20 for allowing data to pass through). Any non standard application that cannot directly transfer data can send CCRP message to dynamically open or close the ports.

According to an embodiment of the invention, a method for automating collateral configuration in a network is provided. The method comprising: configuring a service on a service providing network device; sending a Collateral Configuration Request Protocol (CCRP) message to at least one network infrastructure device in response to the service configuration; and processing the CCRP message to configure the at least one network infrastructure device so that service accessing devices can access the configured service.

According to another embodiment of the invention, a method for automatically initiating collateral configuration in a network is provided. The method comprising: configuring a service on a service providing network device; and sending a Collateral Configuration Request Protocol (CCRP) message to at least one network device to initiate collateral configuration on the at least one network device.

According to yet another embodiment of the invention, a method for enabling automatic collateral configuration in a network is provided. The method comprising: receiving a Collateral Configuration Request Protocol (CCRP) message from a network device, wherein the network device is a service providing device; and processing the received CCRP message to enable automatic collateral configuration, wherein the CCRP message is processed by remaining network devices, wherein the remaining network devices are service accessing devices.

According to yet another embodiment of the invention, a method for automating collateral configuration in a network is provided. The method comprising: configuring a service on a network device, wherein the network device is a service providing device; sending a Collateral Configuration Request Protocol (CCRP) message to a Network Management System, wherein the CCRP message is sent on the basis of the configured service; and processing the CCRP message by the Network Management System for automatic collateral configuration of remaining network devices, wherein the automatic collateral configuration allows the remaining network devices to access the configured service, wherein the remaining network devices are service accessing devices.

According to yet another embodiment of the invention, a system for automating collateral configuration in a network is provided. The system comprising: a service providing device for sending a Collateral Configuration Request Protocol (CCRP) message, wherein the service providing device has a configured service; and a plurality of service accessing devices, the service accessing devices receiving the CCRP message from the service providing device, wherein the service accessing devices are collaterally configured to access the configured service.

According to yet another embodiment of the invention, a system for automating collateral configuration in a network is provided. The system comprising: a service providing device for sending a Collateral Configuration Request Protocol (CCRP) message, wherein the service providing device has a configured service; a Network Management System for receiving the CCRP message from the service providing device, wherein the Network Management System processes the CCRP message; and a plurality of service accessing devices, wherein the service accessing devices are configured by the Network Management System based on the received CCRP message.

According to yet another embodiment of the invention, an apparatus for automating collateral configuration in a network is provided. The apparatus comprising: a processor coupled to a plurality of network devices via a network; a memory coupled to the processor; a machine-readable medium including one or more instructions executable by the processor for configuring a service on a service providing network device; sending a Collateral Configuration Request Protocol (CCRP) message to at least one network infrastructure device in response to the service configuration; and processing the CCRP message to configure the at least one network infrastructure device so that service accessing devices can access the configured service.

According to yet another embodiment of the invention, an apparatus for automating collateral configuration in a network is provided. The apparatus comprising: a processor coupled to a plurality of network devices via a network; a memory coupled to the processor; a machine-readable medium including one or more instructions executable by the processor for configuring a service on a network device, wherein the network device is a service providing device; sending a Collateral Configuration Request Protocol (CCRP) message to a Network Management System, wherein the CCRP message is sent on the basis of the configured service; and processing the CCRP message by the Network Management System for automatic collateral configuration of remaining network devices, wherein the automatic collateral configuration allows the remaining network devices to access the configured service, wherein the remaining network devices are service accessing devices.

According to yet another embodiment of the invention, a machine-readable medium including instructions executable by the processor is provided. The machine-readable medium including instructions executable by the processor comprising: one or more instructions for configuring a service on a service providing network device; one or more instructions for sending a Collateral Configuration Request Protocol (CCRP) message to at least one network infrastructure device in response to the service configuration; and one or more instructions for processing the CCRP message to configure the at least one network infrastructure device so that service accessing devices can access the configured service.

According to yet another embodiment of the invention, a network is provided. The network comprising: a plurality of network devices; and a protocol defined on the plurality of network devices for exchanging requests for collateral configuration on at least one of the plurality of network devices, said requests interpreted in accordance with said protocol by the network devices receiving the requests.

Embodiments of the invention overcome the shortcomings of conventional methods, to achieve collateral configuration manually. Embodiments of the invention provide the flexibility and ease of achieving collateral configuration in large network setups. Moreover, since the invention can be practiced in static as well as dynamic configuration modes, the network operation is not interrupted for automatic collateral configuration of network devices. Further, embodiments of the invention provide automatic collateral configuration with as well as without NMS. Automatic collateral configuration with NMS provides centralized enforcement of policies in the network, better network auditing capabilities, bridging between network devices that have been manufactured by different vendors, reducing the 'sh.run' commands used to view the complete configuration of a network router, and conversion of configuration mechanism.

Automatic collateral configuration without NMS provides ease of deploying collateral configuration in small network setups. Further, no heavy-weight servers are required to run NMS application. Automatic collateral configuration allows the network administrator to configure the roles played by each network device in a network. This allows CCRP message to be directed to specific network devices with specific roles. Automatic collateral configuration also allows network devices to work in a collaborative fashion.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although thes, operations, or computations may be presented in a specific order, this order may be changed in different embodiments. In some embodiments, multiples shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components ors will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
   configuring, on a service providing device, a service that is to be provided in a network;
   generating, using the service providing device and based on configuring the service, a collateral configuration request protocol (CCRP) message, wherein the CCRP message includes a destination field that indicates a type of network device that the CCRP message is intended for such that the CCRP message, upon being transmitted in the network, is accepted by network devices associated with the type of network device indicated by the destination field, the CCRP message further including:
   information for facilitating an auto-configuration of the network devices accepting the CCRP message,
   instructions for configuring the network devices such that the network devices are configured to access the service from the service providing device, and reasoning information for sending the instructions; and
   transmitting, using the service providing device, the CCRP message to the network such that the CCRP message is accepted by at least one network device associated with the type indicated by the destination field in the CCRP message.

2. The method of claim 1, further comprising configuring the CCRP message to have instructions for collateral configuration.

3. The method of claim 1 further comprising creating the CCRP message on a basis of the configured service prior to sending the CCRP message.

4. The method of claim 1, wherein the CCRP message indicates a kind of network device and a role of the network device that the CCRP message is intended for.

5. The method of claim 1, further comprising configuring the CCRP message to have an automatic collateral configuration that is a static collateral configuration.

6. The method of claim 1, further comprising configuring the CCRP message to have an automatic collateral configuration that is a dynamic collateral configuration.

7. The method of claim 1, wherein the reasoning information comprises
   information related to the instructions that are distinct from the instructions.

8. A method comprising:
   receiving a collateral configuration request protocol (CCRP) message from a service providing device, wherein the service providing device is configured to generate and send the CCRP message, wherein the CCRP message includes a destination field that indicates a type of network device that the CCRP message is intended for such that the CCRP message, upon being transmitted in the network, is accepted by network devices associated with the type of network device indicated by the destination field, the CCRP message further including instructions for collateral configuration and reasoning information for sending the instructions; and
   processing the received CCRP message to enable an automatic collateral configuration, wherein information in the CCRP message is processed by a service accessing device, the service accessing device being a network device of the type indicated by the destination field in the CCRP message, the information causing the service accessing device to configure itself such that the service accessing device is able to access a service at the service providing device.

9. The method of claim 8 further comprising creating the CCRP message on a basis of the service that is configured using the service providing device prior to sending the CCRP message.

10. The method of claim 8, the method further comprising securing the CCRP message.

11. The method of claim 8, wherein the processing the CCRP message comprises:
    receiving the CCRP message, wherein the CCRP message is received by a service accessing device, the service accessing device being a network device;
    determining, using the service accessing device, whether a type of the service accessing device matches the type indicated by the destination field in the CCRP message;
    based on determining that the type of the service accessing device matches the type indicated by the destination field in the CCRP message, accepting the CCRP message;

classifying, by the service accessing, the CCRP message, wherein the CCRP message is classified to determine a reaction of the service accessing device to the CCRP message; and configuring the service accessing device, wherein the service accessing device is configured based on the instructions contained in the CCRP message, such that the service accessing device is able to access the configured service at the service providing device.

12. The method of claim 11, wherein classifying the CCRP message comprises:
   authenticating the CCRP message; and
   abstracting the CCRP message.

13. The method of claim 8, further comprising configuring the automatic collateral configuration to be a static collateral configuration.

14. The method of claim 8, further comprising configuring the automatic collateral configuration to be a dynamic collateral configuration.

15. An apparatus comprising:
   a processor coupled to a plurality of network devices via a network; and
   a non-transitory machine-readable storage medium including one or more instructions executable by the processor for:
      configuring a service on a service providing device, wherein the configuring is performed by the service providing device, the service being configured to be provided in a network; and
      transmitting a collateral configuration request protocol (CCRP) message to at least one network device in response to the configured service, wherein the CCRP message is configured to enable an automatic collateral configuration, wherein the service providing device is configured to generate and send the CCRP message, wherein the CCRP message includes a destination field that indicates a type of network device that the CCRP message is intended for such that the CCRP message, upon being transmitted in the network, is configured to be accepted by network devices associated with the type of network device indicated by the destination field, the CCRP message further including instructions for configuring the network devices and reasoning information for transmitting the instructions,
      wherein the CCRP message is configured to cause the at least one network device to configure itself based on the instructions included in the CCRP message such that the network device is able to access the configured service at the service providing device, and wherein the automatic collateral configuration occurs without requiring an administrator to manually perform the automatic collateral configuration.

16. The apparatus of claim 15 further comprising:
   at least one additional apparatus for automating collateral configuration in the network, the at least one additional apparatus comprising:
      a second processor coupled to a plurality of network devices via a network; and
      another non-transitory machine-readable storage medium including one or more instructions executable by the second processor for receiving and processing the CCRP message to configure the at least one additional apparatus to access the configured service.

17. A system comprising:
   a processor coupled to at least one service providing device in a network, where a service providing device comprises a network device; and
   a non-transitory machine-readable storage medium including one or more instructions executable by the processor for:
      receiving a collateral configuration request protocol (CCRP) message in response to configuring a service at the service providing device, wherein the service providing device is configured to generate and send the CCRP message, wherein the CCRP message is configured to enable an automatic collateral configuration, wherein the CCRP message includes a destination field that indicates a type of network device that the CCRP message is intended for such that the CCRP message is configured to be accepted by network devices of the type indicated by the destination field, the CCRP message further including instructions for configuring the network devices and reasoning information for sending the instructions, wherein the CCRP message is configured to cause the network device to configure itself based on the instructions included in the CCRP message such that the network device is enabled to access the service at the service providing device, and wherein the automatic collateral configuration occurs without a requirement for an administrator to manually perform the automatic collateral configuration; and
      processing the CCRP message to allow at least one service accessing apparatus to access the service.

18. The system of claim 17, further comprising one or more service accessing devices, the one or more service accessing devices being configured to receive the CCRP message from the service providing device, wherein the one or more service accessing devices comprise:
   a receiver for receiving the CCRP message;
   the processor for authenticating the received CCRP message;
   the processor for abstracting the received CCRP message; and
   means for collaterally configuring the one or more service accessing devices.

19. The system of claim 17, wherein the service providing device includes:
   at least one processor;
   a non-transitory machine-readable storage medium including one or more instructions executable by the at least one processor for:
      configuring the service;
      creating the CCRP message after configuring the service, wherein the CCRP message is created on a basis of the configured service;
      securing the CCRP message; and
      sending the CCRP message.

20. A method comprising:
   receiving, using a service accessing device, a collateral configuration request protocol (CCRP) message, the service accessing device being a network device, wherein the CCRP message is generated by a service providing device based on configuring a service, the CCRP message including a destination field indicating a type of network device that the CCRP message is intended for such that the CCRP message, upon being transmitted in the network by the service providing device, is accepted by network devices associated with the type of network device indicated by the destination field, the CCRP message further including:

information for an auto-configuration of the network devices accepting the CCRP message,
instructions for configuring the network devices such that the network devices are configured to access the service at the service providing device, and
reasoning information for sending the instructions;
determining, using the service accessing device, whether a type of the service accessing device matches the type indicated by the destination field in the CCRP message;
based on determining that the type of the service accessing device matches the type indicated by the destination field in the CCRP message, accepting the CCRP message;
classifying, using the service accessing device, the CCRP message, wherein the CCRP message is classified to determine a reaction of the service accessing device to the CCRP message; and
configuring the service accessing device, wherein the service accessing device is configured based on the instructions contained in the CCRP message, such that the service accessing device is enabled to access the configured service at the service providing device.

21. The method of claim 20, wherein classifying the CCRP message comprises:
authenticating the CCRP message; and
abstracting the CCRP message.

22. A method comprising:
configuring, on a service providing device, a service that is to be provided in a network;
generating, using the service providing device and based on configuring the service, a collateral configuration request protocol (CCRP) message, wherein the CCRP message includes a destination field that indicates a type of network device that the CCRP message is intended for such that the CCRP message, upon being transmitted in the network, is accepted by network devices associated with the type of network device indicated by the destination field, the CCRP message further including:
information for facilitating an auto-configuration of the network devices accepting the CCRP message,
instructions for configuring the network devices such that the network devices are configured to access the service from the service providing device, and
reasoning information for sending the instructions; and
sending, using the service providing device, the CCRP message to the network such that the CCRP message is received by at least one network device associated with the type indicated by the destination field in the CCRP message.

23. A method comprising:
configuring, on a service providing device, a service that is to be provided in a network;
generating, using the service providing device and based on configuring the service, a collateral configuration request protocol (CCRP) message, wherein the CCRP message includes a destination field that indicates a type of network device that the CCRP message is intended for such that the CCRP message, upon being transmitted in the network, is accepted by network devices associated with the type of network device indicated by the destination field, the CCRP message further including:
information for facilitating an auto-configuration of the network devices accepting the CCRP message,
instructions for configuring the network devices such that the network devices are configured to access the service from the service providing device, and
information related to the instructions that are distinct from the instructions,
wherein the information comprises reasoning information for sending the instructions; and
sending, using the service providing device, the CCRP message to the network such that the CCRP message is accepted by at least one network device associated with the type indicated by the destination field in the CCRP message.

24. A method comprising:
configuring, on a service providing device, a service that is to be provided in a network;
generating, using the service providing device and based on configuring the service, a collateral configuration request protocol (CCRP) message, wherein the CCRP message includes a destination field that indicates a type of network device that the CCRP message is intended for such that the CCRP message, upon being transmitted in the network, is accepted by network devices associated with the type of network device indicated by the destination field, the CCRP message further including:
information for facilitating an auto-configuration of the network devices accepting the CCRP message,
instructions for configuring the network devices such that the network devices are configured to access the service from the service providing device, and
information related to the instructions that are distinct from the instructions, wherein the information comprises reasoning information for sending the instructions; and
transmitting, using the service providing device, the CCRP message to the network such that the CCRP message is accepted by at least one network device associated with the type indicated by the destination field in the CCRP message.

* * * * *

UNITED STATES PATENT AND TRADEMARK OFFICE
CERTIFICATE OF CORRECTION

| | | |
|---|---|---|
| PATENT NO. | : 8,078,679 B2 | Page 1 of 1 |
| APPLICATION NO. | : 11/403794 | |
| DATED | : December 13, 2011 | |
| INVENTOR(S) | : Kajekar et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 539 days.

Signed and Sealed this
Eighth Day of May, 2012

David J. Kappos
*Director of the United States Patent and Trademark Office*